US008688939B2

(12) United States Patent
Emaru et al.

(10) Patent No.: US 8,688,939 B2
(45) Date of Patent: *Apr. 1, 2014

(54) STORAGE SYSTEM AND STORAGE SUBSYSTEM

(71) Applicants: Hironori Emaru, Yokohama (JP); Nobuhiro Maki, Yokohama (JP)

(72) Inventors: Hironori Emaru, Yokohama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,251

(22) Filed: Dec. 31, 2012

(65) Prior Publication Data

US 2013/0124808 A1    May 16, 2013

Related U.S. Application Data

(63) Continuation of application No. 12/034,977, filed on Feb. 21, 2008, now Pat. No. 8,347,049.

(30) Foreign Application Priority Data

Nov. 2, 2007 (JP) ................................. 2007-286652

(51) Int. Cl.
*G06F 12/00* (2006.01)
(52) U.S. Cl.
USPC .................................. 711/162; 711/E12.103
(58) Field of Classification Search
None
See application file for complete search history.

(56) References Cited

U.S. PATENT DOCUMENTS

| 4,306,287 | A | * | 12/1981 | Huang ........................... 711/217 |
| 5,287,485 | A | * | 2/1994 | Umina et al. .................. 711/120 |
| 5,742,792 | A | * | 4/1998 | Yanai et al. .................... 711/162 |
| 5,758,067 | A | * | 5/1998 | Makinen et al. ................ 714/54 |
| 6,266,784 | B1 | * | 7/2001 | Hsiao et al. .................... 714/6.3 |
| 6,477,591 | B1 | * | 11/2002 | VanderSpek .................... 710/38 |
| 7,028,153 | B1 | * | 4/2006 | Noble et al. .................. 711/162 |
| 7,225,190 | B2 | | 5/2007 | Iwamura et al. |
| 7,237,078 | B2 | | 6/2007 | Hiraiwa et al. |

(Continued)

FOREIGN PATENT DOCUMENTS

| JP | 2007-047892 | 2/2007 |
| JP | 2007-140651 | 6/2007 |
| JP | 2007-249447 | 9/2007 |

*Primary Examiner* — Edward Dudek, Jr.
*Assistant Examiner* — Christopher Birkhimer
(74) *Attorney, Agent, or Firm* — Antonelli, Terry, Stout & Kraus, LLP.

(57) ABSTRACT

Storage system arrangements having status information including both copy group summary status information providing a status of a group of the plurality of copy pairs, and detailed status information detailing a status of a copy pair included in the group; and wherein said status management unit monitors the status information of said plurality of copy pairs, wherein the management computer acquires, from the storage apparatus, the copy group summary status information as summary information for a group of the plurality of copy pairs having a failure status for the group, and displays said summary information on said display, if the summary information indicates a normal status, the management computer displays the summary information only; and if the summary information indicates a failure status, the management computer displays, upon receiving selection of said summary information, detailed status information of a copy pair that belongs to the group.

4 Claims, 17 Drawing Sheets

(56) References Cited

U.S. PATENT DOCUMENTS

| | | |
|---|---|---|
| 7,305,536 B2 * | 12/2007 | Tabata et al. .............. 711/165 |
| 7,487,285 B2 * | 2/2009 | Holland et al. ............ 710/316 |
| 7,548,996 B2 * | 6/2009 | Baker et al. ............... 710/22 |
| 7,644,224 B2 * | 1/2010 | Murin et al. ............... 711/103 |
| 2003/0177149 A1 * | 9/2003 | Coombs ..................... 707/204 |
| 2003/0188114 A1 * | 10/2003 | Lubbers et al. ........... 711/162 |
| 2004/0243778 A1 * | 12/2004 | Barrios et al. ............. 711/165 |
| 2005/0210078 A1 | 9/2005 | Maruyama et al. |
| 2005/0257015 A1 | 11/2005 | Hiraiwa et al. |
| 2006/0085610 A1 * | 4/2006 | Iwamura et al. ........... 711/162 |
| 2006/0085611 A1 | 4/2006 | Ikeda et al. |
| 2006/0101217 A1 | 5/2006 | Maki et al. |
| 2006/0161721 A1 | 7/2006 | Iwamura et al. |
| 2006/0224845 A1 | 10/2006 | Hiraiwa et al. |
| 2007/0033355 A1 | 2/2007 | Maki et al. |
| 2007/0220322 A1 * | 9/2007 | Mikami ..................... 714/13 |
| 2007/0250673 A1 * | 10/2007 | Eidswick ................... 711/162 |
| 2009/0240854 A1 * | 9/2009 | Cedar et al. ............... 710/104 |
| 2009/0300281 A1 * | 12/2009 | Allen ........................ 711/113 |
| 2010/0229047 A1 | 9/2010 | Mikami |

* cited by examiner

FIG.3

| STATUS OF COPY PAIR | STATUS OF COPY GROUP | FLAG |
|---|---|---|
| ALL PAIRS ARE SIMPLEX | Simplex | STATIONARY |
| INCLUDES SIMPLEX/SUSPEND AND PAIR AND COPYING (IN CASES WHERE SIMPLEX/SUSPEND→PAIR) | Copying | TRANSIENT |
| ALL PAIRS ARE PAIR | Pair | STATIONARY |
| INCLUDES PAIR AND SUSPEND AND COPYING (IN CASES WHERE PAIR →SUSPEND) | Suspending | TRANSIENT |
| ALL PAIRS ARE SUSPEND | Suspend | STATIONARY |
| INCLUDES PAIR/SUSPEND AND SIMPLEX AND COPYING (IN CASES WHERE PAIR/SUSPEND →SIMPLEX) | Deleting | TRANSIENT |
| INCLUDES AT LEAST ONE PAIR THAT IS ERROR | Error | FAILURE |

FIG.4

| COPY GROUP NAME | PAIR NAME | PAIR STATUS | PRIMARY VOL | SECONDARY VOL | |
|---|---|---|---|---|---|
| CG.01 | P1 | Pair | VOL11 | VOL14 | 4600 |
| | P2 | Pair | VOL12 | VOL15 | 4700 |
| | P3 | Pair | VOL13 | VOL16 | 4800 |

| COPY GROUP NAME | STATUS | FLAG | |
|---|---|---|---|
| CG.01 | Pair | STATIONARY | 5400 |

| COPY GROUP NAME | CONCORDANCE RATE | |
|---|---|---|
| CG.01 | 98% | 6300 |

| FLAG VALUE | TRANSFER TABLE TYPE | | | |
|---|---|---|---|---|
| | SUMMARY TABLE | PAIR STATUS TABLE | ADDITIONAL INFORMATION TABLE | |
| STATIONARY | O | × | O | 8320 |
| FAILURE | O | O | × | 8340 |
| TRANSIENT | O | × | × | 8340 |

FIG.10

| COPY GROUP NAME | STATUS | FLAG | CONCORDANCE RATE |
|---|---|---|---|
| CG.01 | Pair | STATIONARY | 98% |

| COPY GROUP NAME | PAIR NAME | PAIR STATUS | PRIMARY VOL | SECONDARY VOL |
|---|---|---|---|---|
| CG.01 | P1 | Pair | VOL11 | VOL14 |
| | P2 | Pair | VOL12 | VOL15 |
| | P3 | Pair | VOL13 | VOL16 |

| COPY GROUP NAME | STATUS | CONCORDANCE RATE |
|---|---|---|
| CG.01 | Pair | 98% |

| COPY GROUP NAME | STATUS | CONCORDANCE RATE |
|---|---|---|
| CG.01 | Error | N/A |

| COPY GROUP NAME | STATUS | CONCORDANCE RATE |
|---|---|---|
| CG.01 | Copying | N/A |

| PAIR NAME | PAIR STATUS | PRIMARY VOL | SECONDARY VOL |
|---|---|---|---|
| P1 | Pair | VOL11 | VOL14 | ~14500
| P2 | Error | VOL12 | VOL15 | ~14600
| P3 | Pair | VOL13 | VOL16 | ~14700

| PAIR NAME | PAIR STATUS | PRIMARY VOL | SECONDARY VOL |
|---|---|---|---|
| P2 | Error | VOL12 | VOL15 | ~14600

| COPY GROUP NAME | STATUS | CONCORDANCE RATE | |
|---|---|---|---|
| CG.01 | Pair | 98% | 15100 |
| CG.02 | Error | N/A | 15200 |
| CG.03 | Copying | N/A | 15300 |

| COPY GROUP NAME | DIFFERENTIAL TIME | BUFFER USAGE |
|---|---|---|
| CG.01 | 2 SECONDS | 15% |

| COPY GROUP NAME | STATUS | FLAG | DIFFERENTIAL TIME | BUFFER USAGE |
|---|---|---|---|---|
| CG.01 | Pair | STATIONARY | 2 SECONDS | 15% |

| COPY GROUP NAME | STATUS | DIFFERNTIAL TIME | BUFFER USAGE |
|---|---|---|---|
| CG.01 | Pair | 2 SECONDS | 15% |

COPY GROUP DEFINITION COMMAND TABLE

| COPY GROUP NAME | PAIR NAME | PRIMARY VOL | SECONDARY VOL |
|---|---|---|---|
| CG.01 | P1 | VOL11 | VOL14 |
| | P2 | VOL12 | VOL15 |
| | P3 | VOL13 | VOL16 |

20100, 20200, 20400, 20500, 20600, 20700, 20800, 20000

STORAGE SYSTEM AND STORAGE SUBSYSTEM

CROSS REFERENCE TO RELATED APPLICATION

This is a continuation of U.S. application Ser. No. 12/034,977, filed Feb. 21, 2008. This application relates to and claims priority from Japanese Patent Application No. 2007-286652, filed on Nov. 2, 2007. The entirety of the contents and subject matter of all of the above is incorporated herein by reference.

BACKGROUND

The present invention generally relates to a storage system configured from a host computer, a storage apparatus and a management computer, and to a storage subsystem storing information associated with access from the storage system and the host computer, and in particular to technology for acquiring the status of copy pairs configured with the storage apparatus.

The importance of nondisruptive operation and data protection in corporate information systems is ever-increasing due to the globalization of markets and the provision of 24/7 services via the Web. Nevertheless, there are numerous risks such as terrorism and natural disasters that may lead to the disruption or data loss of corporate information systems. In order to reduce these risks, it is necessary to assume that such disasters or failures will occur, and to plan in advance by when and how to restore the system that is shut down during the disaster or failure. This is known as "Disaster Recovery," and will be hereinafter referred to as "DR."

With DR, it is important to preliminarily set forth indexes indicating which data at what point in time is to be recovered by when, and operate the system while monitoring that such indexes are being observed. Among the foregoing indexes, the former; namely, the index showing which data at what point in time should be recovered is referred to as a "Recovery Point Objective" (hereinafter referred to as "RPO"), and the latter; namely, the index showing by when the business should be resumed after being affected by the disaster is referred to as a "Recovery Time Objective."

Generally, a case where a volume to be copied is stored in the same storage apparatus as the foregoing volume is referred to as a local copy, and a case where a volume to be copied is stored in a different storage apparatus than the foregoing volume is referred to as a remote copy, and this is employed in information systems demanded of high reliability. Local copy and remote copy are sometimes collectively referred to as replication. According to this replication technology, even when a failure occurs in one of the volumes and becomes inoperable, the system operation can be continued by using the data stored in the other volume.

The two volumes of a copy source and a copy destination of a replication relationship are referred to as a copy pair. Normally, a copy pair is grouped in host computer units or application units, and the copy pair is controlled and monitored in such units. A plurality of copy pairs grouped in host computer units or application units are referred to as a copy group.

Remote copy is fundamental technology for realizing DR which prepares a remote site at a location that is geographically distant from the site (local site) conducting the business, and creates the entirely same data as the local site in the remote site.

There are two types of remote copy; namely, synchronous remote copy which returns a write completion reply to the server upon waiting for the data write completion reply on the remote site side when the business host issues an I/O [request], and asynchronous remote copy which returns a write completion reply to the server without waiting for the data write completion reply on the remote site side. With asynchronous remote copy, since it is possible to suppress the influence on the business reply performance even during the bandwidth fluctuation of the network or sudden fluctuations in the business load, this is effective when installing the remote site at a great distance or when using a network line with unstable performance.

Japanese Patent Laid-Open Publication No. 2007-47892 discloses technology concerning a storage system comprising a plurality of host computers and a plurality of storage apparatuses, wherein one storage apparatus controls the copy group extending across a plurality of storage apparatuses, and acquires the copy group and the copy pair status configuring such copy group.

SUMMARY

Incidentally, the size of storage systems is increasing exponentially pursuant to the advancement of the information society and the like. In connection with this, the scope of replication that must be monitored is also ever-increasing explosively. For instance, the number of copy pairs configuring a copy group to be used by a single application is on the verge of reaching several ten to hundred thousand copy pairs.

Meanwhile, asynchronous remote copy is characterized in that, when a failure occurs to even one copy pair configuring a copy group, all copy pairs configuring that copy group will be affected.

With asynchronous remote copy, it is necessary to maintain the consistency of the writing order in copy group units. Thus, if a pair link is disconnected as a result of a failure occurring in any one of the copy pairs configuring the copy group, the storage performs the operation of deleting the pair link of all copy pairs configuring the copy group. The RPO will increase if a failure occurs and the pair link is left in a disconnected state. Thus, in order to maintain the RPO, it is necessary to detect and correct a failure as soon as possible.

The present invention was made in view of the foregoing circumstances. Thus, an object of the present invention is to provide a storage system and a storage subsystem capable of inhibiting the increase of RPO by effectively monitoring the status of copy pairs configured by a storage apparatus and instantaneously detecting a failure that may cause the increase of RPO in a large-scale storage system.

In order to achieve the foregoing object, the present invention consolidates the status information of a plurality of [copy] pairs in a copy group obtained by grouping a plurality of copy pairs in a storage system, and changes the provision granularity of status information to the information request source computer according to the copy group status.

Specifically, proposed is a storage system in which a storage apparatus is provided with a primary storage unit for storing write data from the host computer as a primary volume, a secondary storage unit for storing copied data of write data stored in the primary storage unit as a secondary volume, and a status management unit for collecting and managing status information of a plurality of copy pairs from the primary storage unit and the secondary storage unit with a copy source primary volume and a copy destination secondary volume as a single copy pair. The status management unit monitors the status information of the plurality of copy pairs and transfers the status information of the copy pair subject to a failure to the management computer during a failure, and transfers only the flag information showing information of the overall copy pair to the management computer during a normal status.

As a result of adopting the foregoing configuration, it is possible to facilitate the cause unfolding by the administrator and thereby inhibit the increase of RPO during a failure.

DESCRIPTION OF DRAWINGS

FIG. 3 is a configuration diagram showing an example of a copy group status determination table in the first embodiment;

FIG. 4 is a configuration diagram showing an example of a pair status table in the first embodiment;

FIG. 5 is a configuration diagram showing an example of a summary table in the first embodiment;

FIG. 6 is a conceptual diagram showing an example of an additional information table in the first embodiment;

FIG. 8 is a configuration diagram showing an example of a transfer table determination table in the first embodiment;

FIG. 10 is a configuration diagram showing an example of a copy group summary table in the first embodiment;

FIG. 11 is a configuration diagram showing an example of a copy group pair table in the first embodiment;

FIG. 13A is a diagram showing a display example of a summary GUI in the first embodiment;

FIG. 13B is a diagram showing another display example of a summary GUI in the first embodiment;

FIG. 13C is a diagram showing yet another display example of a summary GUI in the first embodiment;

FIG. 14A is a diagram showing a display example of a detailed GUI in the first embodiment;

FIG. 14B is a diagram showing another display example of a detailed GUI in the first embodiment;

FIG. 15 is a diagram showing a display example of a summary GUI in the first embodiment;

FIG. 17 is a configuration diagram showing an example of an additional information table in the second embodiment;

FIG. 18 is a configuration diagram showing an example of a copy group summary table in the second embodiment;

FIG. 19 is a diagram showing a display example of a summary GUI in the second embodiment;

FIG. 20 is a configuration diagram showing an example of a copy group definition command table in the second embodiment;

DETAILED DESCRIPTION

First Embodiment

The first embodiment of the present invention is now explained. Incidentally, the present invention shall not be limited to the following embodiments explained below.

Figure 1:
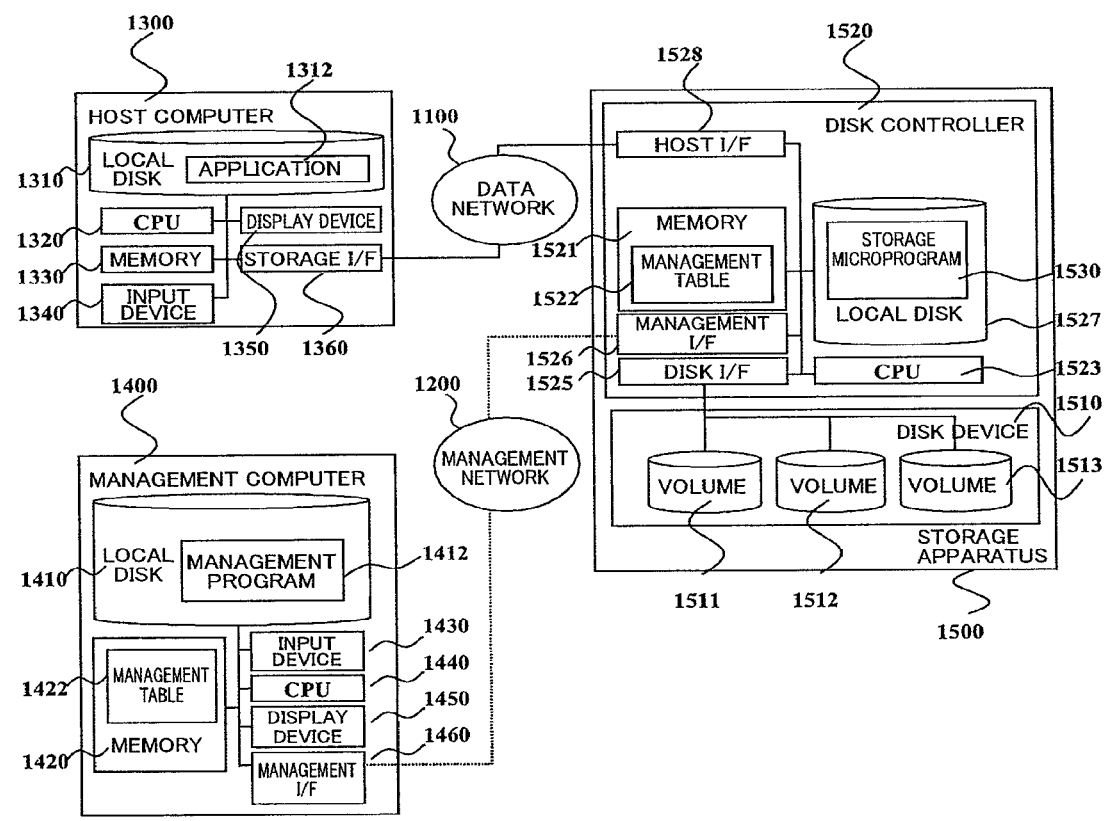
FIG. 1 is a system configuration diagram showing a first embodiment of a storage system according to the present invention.

FIG. 1 is a block diagram showing the configuration of a storage system according to the present embodiment. In this system, with the type of replication being a local copy to be performed in a single storage apparatus 1500, the storage apparatus 1500 and a host computer 1300 are mutually connected via a data network 1100. Although this embodiment explains a case where the data network 1100 is a storage area network, it may also be an IP (Internet Protocol) network or another data communication network.

The storage apparatus 1500 and a management computer 1400 are connected via a management network 1200. Although this embodiment explains a case where the management network 1200 is an IP network, it may also be a storage area network or another data communication network. In addition, the data network 1100 and the management network 1200 may be the same network, and the management computer 1400 and the host computer 1300 may be the same computer.

For the sake of explanation, although FIG. 1 shows a case where there is one storage apparatus 1500, one host computer 1300 and one management computer 1400, and the present invention is not limited to the foregoing configuration.

The storage apparatus 1500 is configured as a storage subsystem comprising a disk device 1510 for storing data, and a disk controller 1520 for controlling the storage apparatus [1520]. The disk device 1510 is configured from a plurality of volumes 1511, 1512, 1513. The volumes 1511, 1512, 1513 may be physical volumes such as hard disk drives (HDDs), or logical volumes such as logical devices, and there is no particular limitation in the present invention. The volumes are able to configure a copy pair, and the operations to be performed to the copy pair and the status transition based on such operations will be described later.

Here, the disk device 1510 functions as a primary storage unit for storing write data from the host computer 1300 as a primary volume, and a secondary storage unit for storing the copied data of such write data stored in the primary storage unit as a secondary volume, and the disk controller 1520 functions as a status management unit for collecting and managing the status information of a plurality of copy pairs from the primary storage unit and the secondary storage unit with a copy source primary volume and a copy destination secondary volume as a single copy pair.

In the foregoing case, the disk controller 1520 monitors the status information of the plurality of copy pairs according to the status of failure, and, upon transferring information, transfers detailed information concerning a copy pair as status information of the copy pair subject to the failure to the management computer 1400 as an information request source, and transfers flag information showing the overall status of all other copy pairs as the status information of the other copy pairs to the management computer 1400.

For the sake of explanation, although FIG. 1 shows a case where there are three volumes, the present invention is not limited to the foregoing configuration.

The disk controller 1520 is provided with a host I/F 1528, a management I/F 1526, a disk I/F 1525, a memory 1521, a CPU 1523, and a local disk 1527. The local disk 1527 is a disk device such as a hard disk connected to the disk controller 1520, and stores a storage microprogram 1530. The storage microprogram 1530 is loaded in the memory 1521 of the disk controller 1520, and executed by the CPU 1523.

Although this embodiment explains a case where the storage microprogram 1530 is stored in the local disk 1527 of the disk controller 1520, the present invention is not limited to the foregoing configuration. For example, these programs and tables may also be stored in a flash memory provided to the disk controller, or in an arbitrary disk in the disk device 1510.

The storage microprogram 1530 receives a command from the management computer 1400 and/or host computer 1300 and controls the copy pair or acquires the copy pair status. As the control of copy pairs, there is the creation of a copy pair for newly creating copy pair, resynchronization of a copy pair for matching the contents of a secondary volume with the contents of a primary volume, and suspending of a copy pair for discontinuing the synchronous relationship. Acquisition of a copy pair status refers to the acquisition of information concerning which status the respective copy pairs are in based on the foregoing control. Transition of the copy pairs to the various statuses based on a control command will be described later. The management table 1522 stored in the memory 1521 will also be described later.

The host I/F 1528 is an interface to the data network 1100, and sends and receives data and control commands to and from the host computer 1300. The management I/F 1526 is an interface to the management network 1200, and sends and receives data and control commands to and from the management computer 1400. The disk I/F 1525 is an interface to the disk device 1510, and sends and receives data and control commands.

The host computer 1300 is configured from an input device 1340 such as a keyboard or a mouse, a CPU 1320, a display device 1350 such as a CRT, a memory 1330, a storage I/F 1360, and a local disk 1310.

The storage I/F 1360 is an interface to the data network 1100, and sends and receives data and control commands to and from the storage apparatus 1500. The local disk 1310 is a disk device such as a hard disk connected to the host computer 1300, and stores an application 1312.

The application 1312 is loaded in the memory 1330 of the host computer 1300, and executed by the CPU 1320. The application 1312 is an application for reading and writing data from and into the volumes in the storage apparatus 1500, and, for instance, is a DBMS or a file system.

For the sake of explanation, although FIG. 1 shows a case where there is one application 1312, the present invention is not limited to the foregoing configuration.

The management computer 1400 is configured from an input device 1430 such as a keyboard or a mouse, a CPU 1440, a display device 1450 such as a CRT, a memory 1420, a local disk 1410, and a management I/F 1460 for sending and receiving data and control commands to and from the storage apparatus 1500 for system management.

The local disk 1410 is a disk device such as a hard disk connected to the management computer 1400, and stores a management program 1412. The management program 1412 is loaded in the memory 1420 of the management computer 1400, and executed by the CPU 1440.

The management program 1412 is a program for providing the function of operating and monitoring the copy pairs of one or more storage apparatuses via the input device 1430 such as a keyboard or a mouse or via the display device 1450 such as a graphical user interface (GUI). The management I/F 1460 is an interface to the management network 1200, and sends and receives data and control commands to and from the storage 1500. The management table 1422 in the memory 1420 will be described later.

Figure 2:
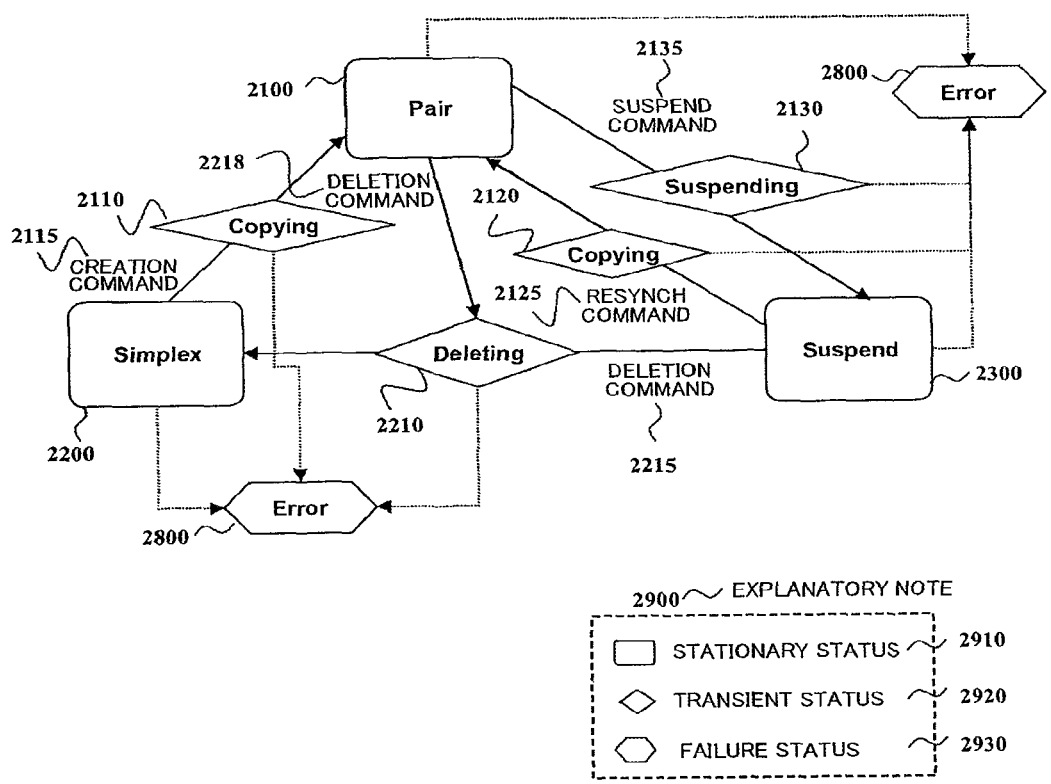
FIG. 2 is a diagram showing the transition of the copy pair status in the first embodiment.

FIG. 2 shows the transition of the copy pair status. The statuses shown in FIG. 2, as indicated in the explanatory note 2900, can be broadly classified into a stationary status 2910, a transient status 2920, and a failure status 2930. Pair 2100, Simplex 2200, and Suspend 2300 are collectively referred to as a stationary status 2910.

Copying 2110 and 2120, Suspending 2130, and Deleting 2210 are collectively referred to as a transient status 2920. The difference between Copying 2110 and 2120 will be explained later. Error 2800 is referred to as a failure status 2930.

The status transition from the stationary status 2910 to the transient status 2920 arises based on a command from the user. A command from a user is usually issued via the input device 1340 of the host computer 1300, and received and executed by the storage microprogram 1530 loaded in the memory 1521 of the storage apparatus 1500.

Nevertheless, the command from a user may also be issued via the input device 1430 of the management computer 1400. The status transition from the transient status 2920 to the stationary status 2910 is conducted by the storage microprogram 1530 loaded in the memory 1521 of the storage apparatus 1500 without the intervention of the user's command.

Simplex 2200 is a status where a copy pair is not formed. When the copy pair status is Simplex 2200, the copy pair status changes to Copying 2110, which is one of the transient statuses 2920, as a result of a copy pair creation command 2115 being issued by the user. Copying 2110 is a copy pair status showing that data is being copied from a primary volume to a secondary volume in order to make the corresponding copy pair into a synchronous status.

When the synchronization of the copy pair is complete, the copy pair status is changed from Copying 2110 to Pair 2100 without the intervention of the user's command. Pair 2100 is a copy pair status showing that the primary volume and the secondary volume are in synch.

As a result of a copy pair deletion command 2218 being issued from the user when the copy pair status is Pair 2100, the copy pair status changes to Deleting 2210, which is one of the transient statuses 2920. Deleting 2210 is a copy pair status showing that the corresponding copy pair is deleting its copy pair relationship. When the deletion of the copy pair relationship is complete, the copy pair status changes from Deleting 2210 to Simplex 2200 without the intervention of the user's command.

As a result of a copy pair suspend command 2135 being issued from the user when the copy pair status is Pair 2100, the copy pair status changes to Suspending 2130, which is one of the transient statuses 2920. Suspending 2130 is a copy pair status showing that the corresponding copy pair is suspending the copy pair relationship.

When the suspending of the copy pair relationship is complete, the copy pair status changes from Suspending 2130 to Suspend 2300 without the intervention of the user's command. Suspend 2300 is a copy pair status showing that, although the copy pair relationship is being maintained internally, the synchronization of the primary volume and the secondary volume is being discontinued.

As a result of a copy pair resynch command 2125 being issued from the user when the copy pair status is Suspend 2300, the copy pair status changes to Copying 2120, which is one of the transient statuses 2920. Copying 2110 and Copying 2120 are the same in that data is copied from the primary volume to the secondary volume in order to make the copy pair a synchronous status. The difference is in that Copying 2110 copies all data of the primary volume to the secondary volume, while Copying 2120 only copies data that was written into the primary volume after the suspend command 2135 was issued to the secondary volume. When the synchronization of the copy pair is complete, the copy pair status changes from Copying 2120 to Pair 2100 without the intervention of the user's command.

As a result of a copy pair deletion command 2215 being issued from the user when the copy pair status is Suspend 2300, the copy pair status changes to Deleting 2210, which is one of the transient statuses 2920. When the deletion of the copy pair relationship is complete, the copy pair status changes from Deleting 2210 to Simplex 2200 without the intervention of the user's command.

When some kind of failure occurs in Pair 2100, Simplex 2200, and Suspend 2300 as all stationary statuses 2910 and in Copying 2110 and 2120, Suspending 2130, and Deleting 2210 as all transient statuses 2920, the copy pair status changes to Error 2800.

FIG. 3 shows the configuration of a copy group status determination table 3000 tabularizing the relationship of the status of the individual copy pairs configuring the copy groups, and the status of the copy groups. Although this embodiment explains a case where the copy group status determination table 3000 is retained in the storage microprogram 1530, the present invention can also be implemented even if the copy group status determination table 3000 is stored separately from the storage microprogram 1530; for instance, stored in the local disk 1527 of the storage apparatus or in a disk of the disk device 1510.

As described above, a copy pair is usually grouped in host computer units or application units, and a copy pair is controlled or monitor in such units. A plurality of copy pairs grouped in host computer units or application units is referred to as a copy group.

The copy group status determination table 3000 is configured from a copy pair status field 3100, a copy group status field 3200, and a flag field 3300.

The copy pair status field 3100 is a field displaying the status of the individual copy pairs configuring a copy group. For example, the field 3105 displays that the status of all copy pairs configuring a copy group is Simplex 2200. The copy group status field 3200 is a field displaying the copy group status when the status of the respective copy pairs configuring the corresponding copy group is as shown in the copy pair status field 3100.

The flag field 3300 is a field displaying whether the copy group is of a stationary status, a transient status or a failure status. Whether the copy group is a stationary status, a transient status or a failure status depends on the copy pair status.

FIG. 4, FIG. 5, and FIG. 6 are configuration diagrams of a pair status table 4000, a summary table 5000, and an additional information table 6000 configuring the management table 1522 created in the memory 1521 of the storage apparatus 1500. The respective tables are explained in detail below.

FIG. 4 shows the configuration of the pair status table 4000 displaying information of the copy pairs configuring a copy group. The pair status table 4000 is configured from a copy group name field 4100, a copy pair name field 4200, a copy pair status field 4300, a primary volume name field 4400, and a secondary volume name field 4500.

The copy group name field 4100 stores the name of the copy group. The copy pair name field 4200 stores the name of the copy pair. Although a copy pair is uniquely identified based on the primary volume name and the secondary volume name, since this alone will make management of a copy pair difficult, a copy pair is usually managed with a logical name as the copy pair name described above.

The copy pair status field 4300 stores the status of the copy pair. This field 4300 stores one status among Pair 2100, Simplex 2200, Suspend 2300, Copying 2110 and 2120, Suspending 2130, Deleting 2210, and Error 2800 shown in FIG. 2.

The primary volume name field 4400 stores the volume name of the primary volume of the copy pair. The secondary volume name field 4500 stores the volume name of the secondary volume of the copy pair.

According to the pair status table 4000 in this embodiment, the copy group CG.01 is configured from three copy pairs; namely, a copy pair 4600 named P1, a copy pair 4700 named P2, and a copy pair 4800 named P3, and the status of all of these copy pairs is Pair.

A copy group is normally defined by grouping a plurality of copy pairs in host computer 1300 units or application units at the start of operation. A copy group is defined by the copy group name, the copy pair name of the copy pairs configuring the copy group, a primary volume name, and a secondary volume.

When the copy group is defined, the storage apparatus 1500 creates a pair status table 4000 in the management table stored in the memory 1521, and, based on the defined information, rewrites the copy group name field 4100, the copy pair name field 4200, the primary volume name field 4400, and the secondary volume name field 4500. Here, the pair status field 4300 is a blank column.

FIG. 5 shows the configuration of a summary table 5000 displaying the copy group status as summary information. The summary table 5000 is configured from a copy group name field 5100, a copy group status field 5200, and a flag field 5300.

The copy group name field 5100 displays the name of the copy group. The copy group status field 5200 displays the status of the copy group. The copy group status can be uniquely determined by referring to the copy group status determination table 3000 shown in FIG. 3 if the status of the individual copy pairs configuring the copy group is known, and the value thereof is one among Simplex, Copying, Pair, Suspending, Suspend, Deleting, and Error.

The flag field 5300 is a field displaying whether the copy group is a stationary status, a transient status or a failure status. The value to be stored in the flag field 5300 can be uniquely determined by referring to the copy group status determination table 3000 shown in FIG. 3 if the status of the individual copy pairs configuring the copy group is known, and the value thereof is one among a stationary status, a transient status, and a failure status.

FIG. 6 shows the configuration of an additional information table 6000 storing additional information of the copy group. The additional information table 6000 is configured from a copy group name field 6100 and a concordance rate field 6200.

The copy group name field 6100 displays the name of the copy group. The concordance rate field 6200 displays the concordance rate of the corresponding copy group. A concordance rate is an index showing the degree of synchronization between the primary volume and the secondary volume when the copy group status is Pair.

In this embodiment, the concordance rate of a copy group 6300 named CG.01 is shown to be 98%. The concordance rate is not referred to unless the status of the corresponding copy group is Pair.

Figure 7:
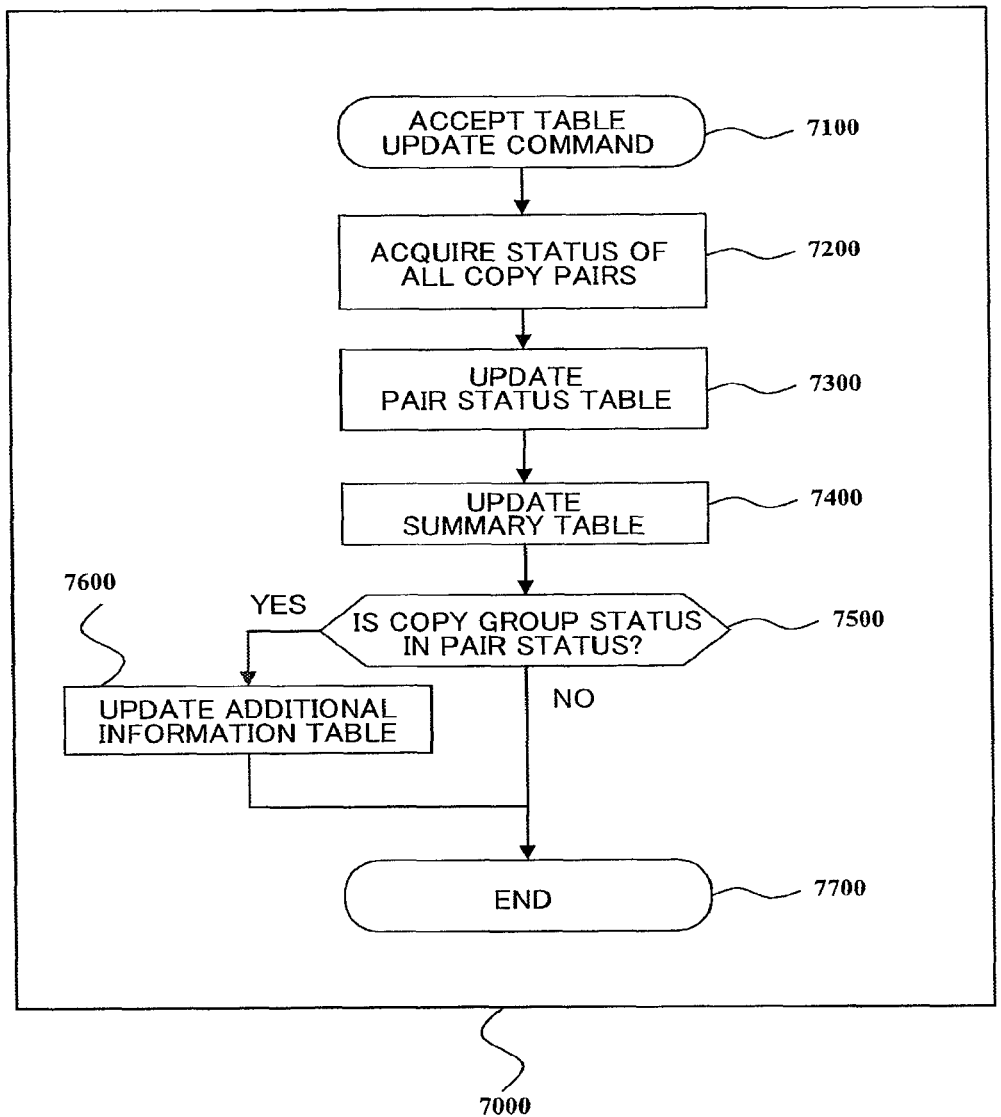
FIG. 7 is a flowchart showing the processing operation of a storage microprogram to perform update processing of a management table in the first embodiment.

The update processing of the management table 1522 created in the memory 1521 of the storage apparatus 1500 is now explained with reference to the flowchart 7000 of FIG. 7. This update processing is performed by the storage microprogram 1530 loaded in the memory 1521 of the storage apparatus 1500.

Foremost, the storage microprogram 1530 receives a management table update command (step 7100). This command may be periodically performed by the microprogram 1530 by providing a timer to the storage microprogram 1530, performed periodically provided by the management computer 1400 using the foregoing timer, or performed randomly according to instructions from the user.

Subsequently, the storage microprogram 1530 acquires all copy pair statuses configuring a copy group (step 7200), and updates the pair status table 4000 based on the copy pair status acquired at step 7200 (step 7300). Here, when the storage microprogram 1530 is to repeat the acquisition of the pair status without changing the configuration concerning a certain copy group, it updates only the copy pair status field 4300 in the pair status table 4000.

The storage microprogram 1530 thereafter updates the copy group status field 5200 and the flag field 5300 of the summary table 5000 based on the copy group status determination table 3000 (step 7400), refers to the copy group status field 5200 of the updated summary table 5000, and checks whether the copy group status is Pair or of another status (step 7500).

If the copy group status is Pair at step 7500, the storage microprogram 1530 acquires the concordance rate of the copy group and stores it in the concordance rate field 6200 of the additional information table 6000 (step 7600), stores the concordance rate of the copy group in the concordance rate field 6200 of the additional information table 6000, and then ends the processing (step 7700).

Meanwhile, if the copy group status is not Pair at step 7500, the storage microprogram 1530 directly ends the processing (step 7700).

FIG. 8 shows the configuration of the transfer table determination table 8000 retained in the storage microprogram 1530 for determining the table to be transferred to the management computer 1400. Although this embodiment explains a case where the transfer table determination table 8000 is retained in the storage microprogram 1530, the present invention can also be implemented even if the transfer table determination table 8000 is stored separately from the storage microprogram 1530; for instance, stored in the local disk 1527 of the storage apparatus or in a disk of the disk device 1510.

The transfer table determination table 8000 is configured from a flag value field 8100 and a transfer table type field 8200. The transfer table type field 8200 is configured from a summary table field 8220, a pair status table field 8240, and an additional information field 8260.

The flag value field 8100 is one among stationary, failure or transient. The transfer table type field 8200 is configured from a summary table field 8220, a pair status table field 8240, and an additional information table field 8260, and shows the table to be transferred according to the flag value.

The field indicating "√" shows the table to be transferred, and the field indicating "–" shows the table that does not need to be transferred. For example, if the flag value is the stationary status 8320, the summary table 5000 and the additional information table 6000 are subject to transfer.

Figure 9:
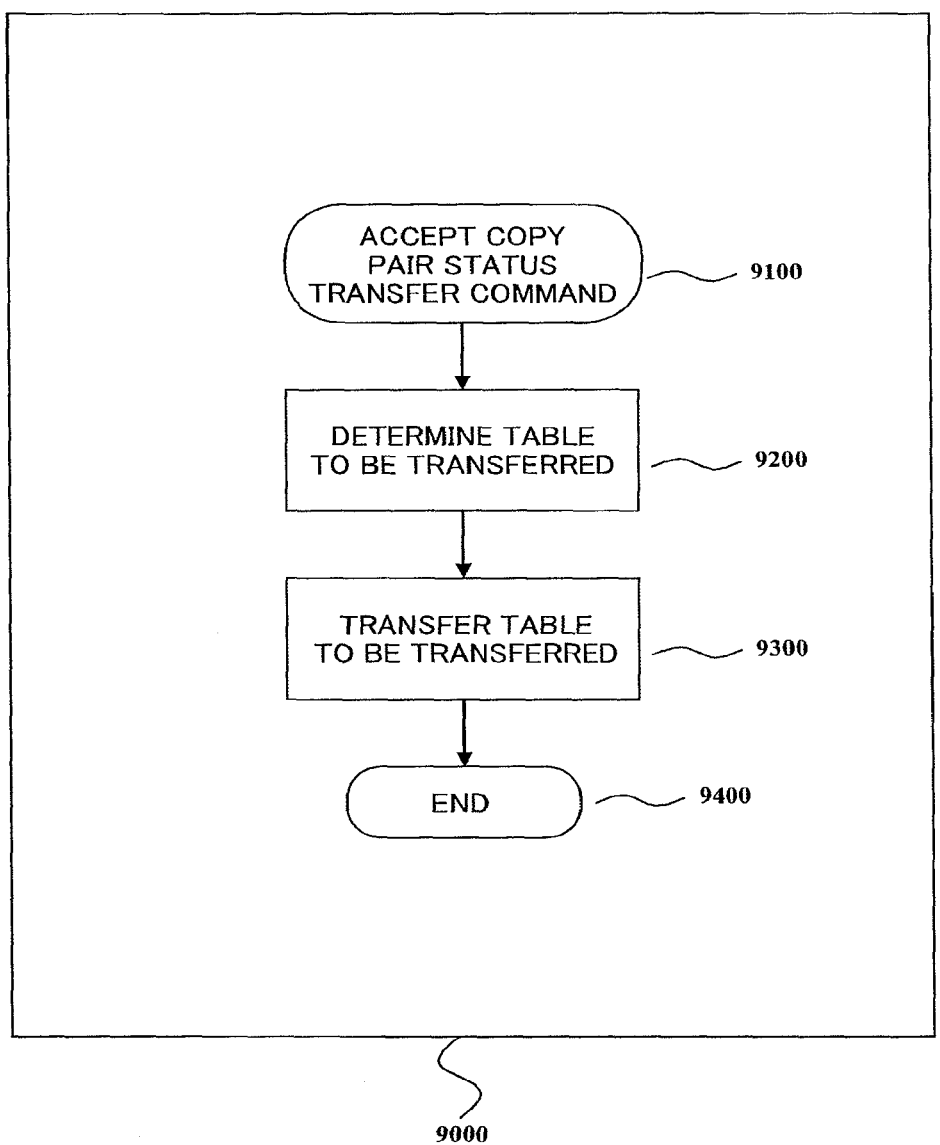
FIG. 9 is a flowchart showing the processing operation of a storage microprogram to perform the transfer of status information of a copy pair in the first embodiment.

The operation upon receiving a copy pair status transfer command to be executed by the storage microprogram 1530 is now explained according to the flowchart 9000 of FIG. 9.

Foremost, the storage microprogram 1530 receives a copy pair status transfer command (step 9100). This command is usually issued by the management program 1412 of the management computer 1400.

Subsequently, the storage microprogram 1530 refers to the flag value stored in the flag field 5300 of the summary table 5000, further refers to the transfer table determination table 8000, and determines the table among the three tables to be transferred according to the corresponding flag value (step 9200).

The storage microprogram 1530 thereafter transfers the table determined to be transferred at step 9200 to the request source in the memory 1521 (step 9300), and, when the transfer is complete, ends the processing (step 9400).

FIG. 10 and FIG. 11 show the configuration of a copy group summary table 10000 and a copy group pair table 11000 configuring the management table 1422 created in the memory 1420 of the management computer 1400. The respective tables are explained in detail below.

FIG. 10 shows the configuration of the copy group summary table 10000 storing summary information of copy groups. The copy group summary table 10000 is configured from a copy group name field 10100, a copy group status field 10200, a flag field 10300, and a concordance rate field 10400.

The copy group name field 10100 displays the name of the copy group. The copy group status field 10200 displays the status of the copy group. The copy group status is one among Simplex, Copying, Pair, Suspending, Suspend, Deleting, and Error.

The flag field 10300 is a field displaying whether the copy group is of a stationary status, a transient status, or a failure status. The value stored in the flag field 5300 is one among stationary status, transient status, and failure status. The concordance rate field 10400 displays the concordance rate of the corresponding copy group. The concordance rate is referred to only when the status of the corresponding copy group is Pair.

FIG. 11 shows a configuration of the copy group table 11000 storing the status of the individual copy pairs configuring a copy group. The configuration of the copy group table 11000 is the same as the pair status table 4000 displaying information of the copy pairs configuring the copy group shown in FIG. 4.

Figure 12:
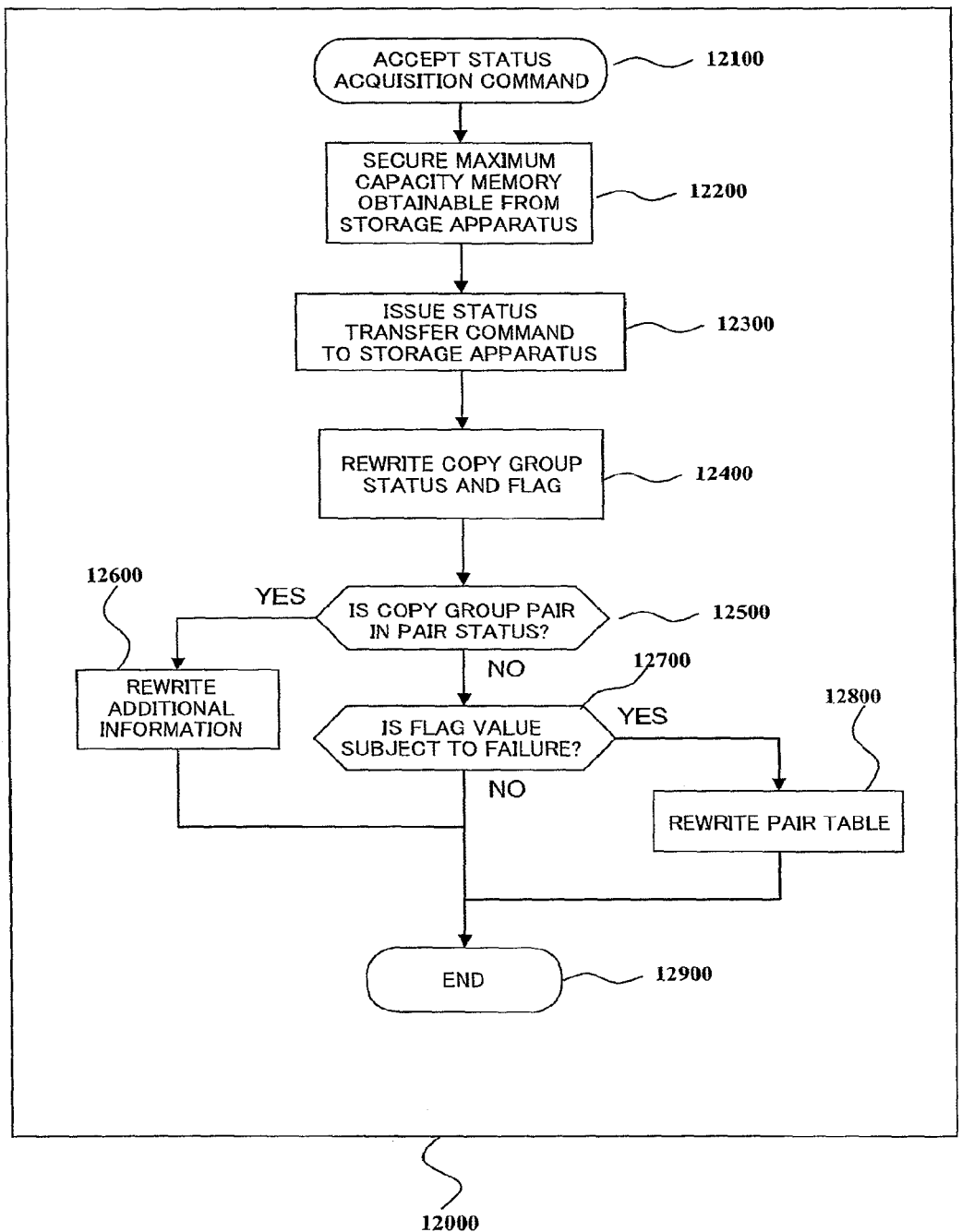
FIG. 12 is a flowchart showing the processing operation of a management program to perform copy group status acquisition processing in the first embodiment.

The copy group status acquisition processing to be executed by the management program 1412 loaded in the memory 1420 of the management computer 1400 is now explained with reference to the flowchart 12000 of FIG. 12.

Foremost, the management program 1412 receives a copy group status acquisition command (step 12100). This command may be performed by the management program 1412 as a result of providing a timer to the management program 1412, or performed randomly according to the user's instructions.

Subsequently, the management program 1412 secures an area of maximum capacity obtainable from the storage apparatus as the management table 1422 in the memory 1422 of the management computer 1400 (step 12200). This area is determined by the size of the copy group summary table 10000, and the size of the copy group pair table 11000 in which the size of the area is determined based on the number of copy pairs configuring a copy group.

The management program 1412 thereafter issues a copy pair status transfer command to the storage apparatus 1500 (step 12300). Here, the storage apparatus 1500 that received the copy pair status transfer command transfers the appropriate table to the management computer 1400 according to the flowchart shown in FIG. 9. In the foregoing case, one or more management tables are transferred from the storage apparatus 1500 to the management computer 1400. These tables contain at least one summary table 5000.

Thus, the management program 1412 rewrites the copy group status field 10200 and the flag field 10300 of the copy group summary table 10000 with the contents of the received summary table 5000 (step 12400).

Subsequently, the management program 1412 checks whether the copy group status 5200 of the received summary table 5000 is Pair (step 12500). If the copy group status 5200 of the received summary table 5000 is Pair at step 12500, the management program 1412 rewrites the concordance rate field 10400 of the copy group summary table 10000 with the contents of the received additional information table 6000 (step 12600).

Meanwhile, if the copy group status 5200 of the received summary table 5000 is not Pair at step 12500, the management program 1412 checks whether the flag value of the received summary table 5000 is failure (step 12700).

If the flag value is failure at step 12700, the management program 1412 rewrites the pair status field 4300 of the copy group pair table 11000 with the contents of the received pair status table 4000 (step 12800), and then ends the processing (step 12900). If the flag value is a value other than failure at step 12700, the management program 1412 directly ends the processing (step 12900).

FIG. 13A, FIG. 13B and FIG. 13C shows examples of the summary GUI 13000 to be displayed on the display device 1450 of the management computer 1400. The summary GUI 13000 is configured from a copy group name field 13100, a copy group status field 13200, and a concordance rate field 13300.

This GUI is created based on information of the copy group summary table 10000 created in the memory 1420 of the management computer 1400. The copy group name field 13100 displays the name of the copy group. The copy group status 13200 displays the status of the copy group. The copy group status is one among Simplex, Copying, Pair, Suspending, Suspend, Deleting, and Error. The concordance rate field 13300 displays the concordance rate of the corresponding copy group. The concordance rate is indicated as N/A if the corresponding copy group status is other than Pair since a valid value is not entered.

FIG. 13A shows the screen display example 13400 in a case when the copy group status is Pair. Since the copy group status is Pair, the pair concordance rate is displayed in the concordance rate field 13300. The pair concordance rate is an index showing the level of synchronization between the primary volume and the secondary volume as described above.

If the pair concordance rate deteriorates, it is possible to predict that some kind of failure may occur. Thus, as a result of the pair concordance rate being displayed when the copy group status is Pair, even when it is the same Pair status, it is possible to know whether the status is free of any problem, or entails the possibility of leading to a failure.

FIG. 13B shows the screen display example 13500 in a case when the copy group status is Error. Since the copy group status is Error, N/A is indicated in the concordance rate field 13300. The copy group name displayed in the copy group name field 13100 can be clicked.

In order to pursue which copy pair is causing the failure among the copy pairs configuring the copy group, a screen displaying a list of copy pairs can be called from this screen. The called screen will be described later.

FIG. 13C shows the screen display example 13600 in a case when the copy group status is Copying. Since the copy group status is Copying, N/A is displayed in the concordance rate field 13300.

FIG. 14A shows an example of the detailed GUI example 14000 to be displayed as a result of clicking the copy group name displayed on the copy group name field 13100 of the summary GUI 13000 when the copy group status is Error. The detailed GUI example 14000 is configured from a copy pair name field 14100, a copy pair status field 14200, a primary volume field 14300, and a secondary volume field 14400.

This GUI is created based on information of the copy group pair table 11000 created in the memory 1420 of the management computer 1400. The copy pair name field 14100 displays the name of the copy pair. Although a copy pair is uniquely identified based on the primary storage apparatus and its volume number and the secondary storage apparatus and its volume number, since this alone will make management of a copy pair difficult, a copy pair is usually managed with a logical name as the copy pair name described above.

The copy pair status field 14200 displays the status of the copy pair. This field displays one status among Pair 2100, Simplex 2200, Suspend 2300, Copying 2110 and 2120, Suspending 2130, Deleting 2210, and Error 2800 shown in FIG. 2.

The primary volume 14300 displays the volume name of the primary volume of the copy pair. The secondary volume 14400 displays the volume name of the secondary volume of the copy pair.

According to the detailed GUI example 14000 in this embodiment, the copy group CG.01 is configured from three copy pairs; namely, a copy pair 14500 named P1, a copy pair 14600 named P2, and a copy pair 14700 named P3, and, since the copy pairs P1 and P3 are Pair, and [copy pair] P2 is Error, it is evident that the copy pair P2 is the cause of failure in the copy group CG.01.

FIG. 14B shows an example of the detailed GUI example 14001 to be displayed as a result of the copy group name displayed on the copy group name field 13100 of the summary GUI 13000 when the copy group status is Error. The configuration of the table is the same as the table shown in FIG. 14A. The detailed GUI example 14001 only displays a pair in which the [copy] pair status is Error.

In a large-scale configuration, there are cases where a single copy group is configured from vast quantities of copy pairs of several ten thousand or more. Even in the foregoing case, the copy group status will be Error when just a couple of copy pairs are subject to a failure. When a failure occurs, as a result of displaying only the copy pair that is causing the failure, it is possible to promptly know the cause of failure even in the foregoing large-scale configuration.

As described above, data is not transferred from the primary volume to the secondary volume when a failure occurs. Thus, when a disaster occurs that will lead to the loss of data of the primary volume during the occurrence of a failure, data during this time will be lost. Since this implies the increase of RPO, it is important to promptly know the cause of failure and to provide a function for dealing with such failure.

This embodiment explained a case where, if the copy group status is Error, the detailed GUI example 14000 or the detailed GUI example 14001 is displayed as a result of clicking the copy group name displayed on the copy group name field 13100 of the summary GUI 13000. Nevertheless, the detailed GUI example 14000 and the detailed GUI example 14001 may both be displayed by switching the screens with a tab or the like.

In this embodiment, when a copy pair status transfer command is issued from the management computer 1400 to the storage apparatus 1500 and the copy group status is a stationary status or a transient status, only the summary table 5000 and the additional information table 5000 in the management table 1522 managed in the storage apparatus 1500 in which the table size is independent of the number of copy pairs are transferred to the management computer 1400, and the pair status table 4000 in which the size expands according to the number of copy pairs is not transferred.

Thus, according to this embodiment, when the copy group status is a stationary status or a transient status, the greater the number of copy pairs configuring a copy group, the reduction effect of the data transfer volume between the management computer 1400 and the storage apparatus 1500 will increase in comparison to conventional methods of transferring the status of all copy pairs configuring a copy group.

In addition, according to this embodiment, when the copy group status is a stationary status or a transient status, the copy group status can be known by displaying only the summary GUI 13000 on the display device 1450 of the management computer 1400. The load of the screen display can be alleviated since it is not necessary to display the status of all copy pairs configuring a copy group.

Although this embodiment explained a case where there is one copy group in the storage apparatus 1500, the present invention can be implemented by performing the following expansion even with a plurality of copy groups.

For example, the management table 1522 of the storage apparatus 1500 is expanded by creating one pair status table 4000, one summary table 5000, and one additional information table 6000 for each copy group. In the foregoing case, the update processing 7000 of the management table 1522 may be performed for each copy group, or collectively performed for all copy groups existing in the storage apparatus 1500.

In addition, the management table 1422 of the management computer 1400 is expanded by creating one copy group summary table 10000, and one copy group pair table 11000 for each copy group. In the foregoing case, the copy group status acquisition processing 12000 may be performed for each copy group, or performed collectively for all copy groups in the storage apparatus 1500.

FIG. 15 shows a display example of the summary screen 15000 displaying the results of the copy group status acquisition processing 12000 when a plurality of copy groups exist in the storage apparatus 1500. Although the configuration of the summary screen 15000 is the same as the summary GUI 13000, since a plurality of copy groups exist, the copy groups are displayed in a plurality of rows.

According to the summary GUI 15000 in this embodiment, there are a copy group 15100 named CG.01, a copy group 15200 named CG.02, and a copy group 15300 named CG.03, the status of the copy group CG.01 is Pair, the concordance rate is 98%, the status of the copy group CG.02 is Error, there is a link to the detailed GUI, and the status of the copy group CG.03 is Copying.

In this embodiment, during the processing 900 to be performed by the storage apparatus 1500 upon receiving the copy pair status transfer command, the storage apparatus 1500 refers to the flag value stored in the flag field 5300 of the summary table 5000, further refers to the transfer table determination table 8000, and, if the flag value is failure, transfers the summary table 5000 and the pair status table 4000 from the memory 1521 to the request source.

Nevertheless, the present invention can be implemented without transferring the pair status table 4000 from the memory 1521 to the request source when the flag value is failure. The difference in the case of not transferring the pair status table 4000 is explained below.

If the copy group status is not Pair at step 12500 of the copy group status acquisition processing 12000 to be executed by the management program 1412 in the management computer 1400, the routine does not proceed to step 12700, and the processing is ended directly.

There is no change to the summary GUI 13000 displayed on the display device 1450 of the management computer 1400, and, when the copy group status is Error, the screen display example 13500 is displayed. The copy group name displayed on the copy group name field 13100 can be clicked, and, when this is clicked, the detailed GUI example 14000 is displayed.

The detailed GUI example 14000 is creates based on information of the copy group pair table 11000 created in the memory 1420 of the management computer 1400, but the update processing of the copy group pair table 11000 is performed before referring to the information. A request of the pair status table 4000 is issued from the management computer 1400 to the storage apparatus 1500, and the pair status table 4000 is transferred from the storage apparatus 1500 to the management computer 1400. The management computer 1400 rewrites the pair status field 4300 of the copy group pair table 11000 with the contents of the received pair status table 4000. After this processing is complete, the management program 1412 displays the detailed GUI example 14000.

Here, even if the flag value is failure, since only the summary table 5000 is transferred to the request source during the initial request, the display response of the summary GUI 13000 in the management computer 1400 can be improved.

Second Embodiment

Although the type of replication was a local copy to be performed in a single storage apparatus 1500 in the first embodiment, the type of replication is a remote copy in the second embodiment, and the present invention can be implemented by expanding the first embodiment as follows. The difference with the first embodiment is explained below.

Figure 16:
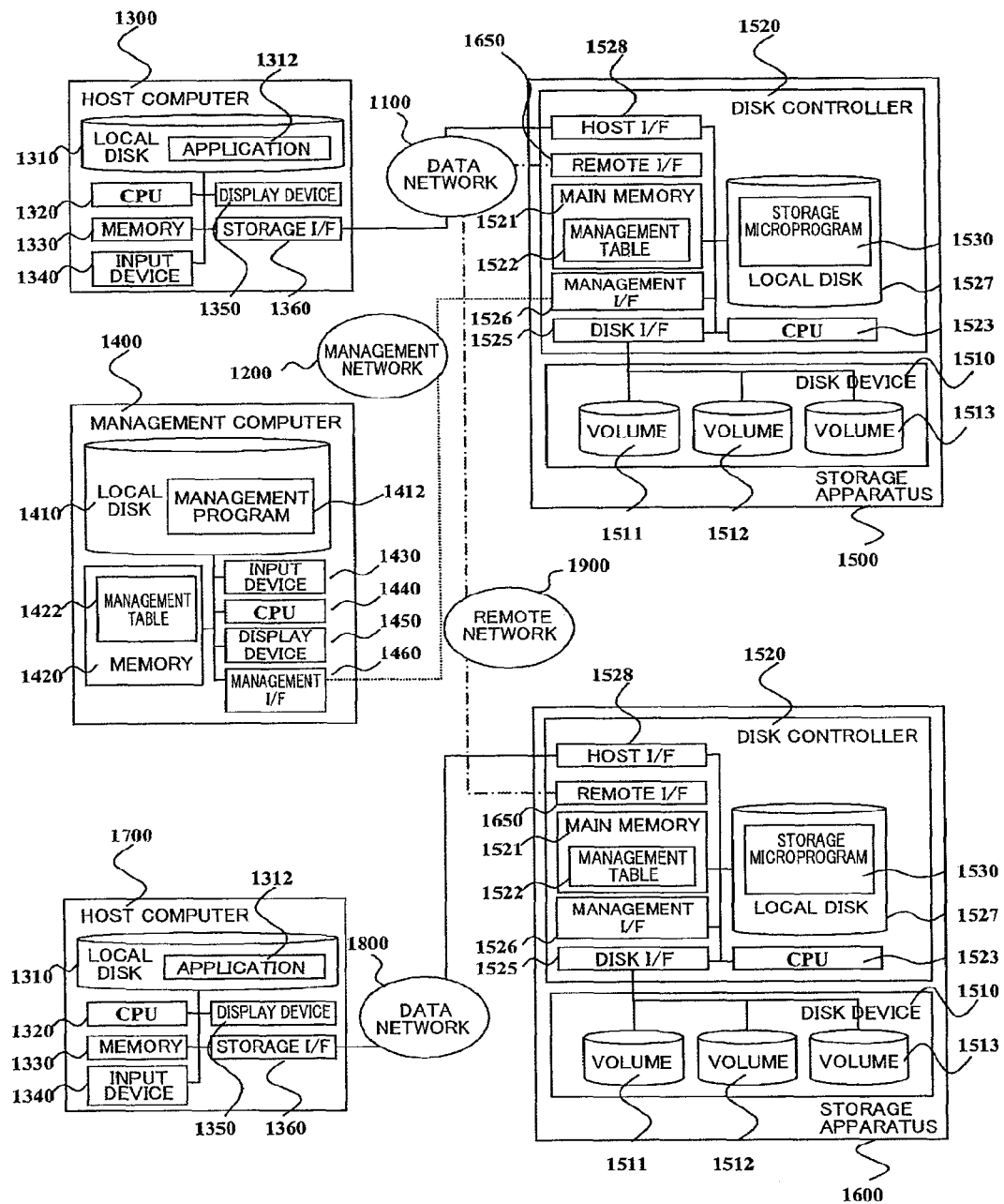
FIG. 16 is a system configuration diagram showing a second embodiment of a storage system according to the present invention.

FIG. 16 is a block diagram showing the configuration of a storage system in a case when the type of replication is a remote copy. In FIG. 16, the storage system comprises a storage apparatus 1600 for storing a secondary volume in addition to the storage apparatus 1500 for storing a primary volume.

The storage apparatus 1500 and the storage apparatus 1600 are mutually connected via a remote network 1900. Although the remote network 1900 is a storage area network in this embodiment, it may also be an IP network or another data communication network. In addition, the configuration may be such that the network is partially a storage area network, and partially an IP network. The data network 1100 and the data network 1800 may also be the same network.

The storage apparatus 1500 and the storage apparatus 1600 comprise a remote I/F 1650 in the disk controller 1520. The remote I/F 1650 is an interface to the remote network 1900, and transfers data between the storage apparatus 1500 and the storage apparatus 1600.

The host computer 1700 is mutually connected to the storage apparatus 1600 for storing the secondary volume via a data network 1800. The configuration of the host computer 1700 is the same as the configuration of the host computer 1300. Here, although the application 1312 is stored in the local disk 1310 as in the case of the storage apparatus 1500 storing the primary volume, the application 1312 may also be stored in a backup program.

Although the concordance rate was handled as additional information when the copy group status is Pair in the case of a local copy, primary/secondary differential time or buffer utilization (journal volume utilization) is handled as additional information in the case of a remote copy.

The primary/secondary differential time is a value showing the time difference between the timing that the data is written into the primary volume and the timing that the data is written into the secondary volume. In order to secure the reply performance in remote copy, there are cases where a write completion reply is returned to the host computer 1300 or 1700 at the time a data is written into the primary volume when a data write request is issued from the host computer 1300 or 1700, and data is written into the secondary volume asynchronously with the writing of data into the primary volume.

This is referred to as an asynchronous remote copy. Since the time difference in the writing of data into the secondary volume depends on the network bandwidth of the remote network 1900 between the storage apparatus 1500 storing the primary volume and the storage apparatus 1600 storing the secondary volume, it is important to monitor the primary/secondary differential time.

In the asynchronous remote copy, when a write request is issued from the host computer 1300 or 1700, the primary storage apparatus 1500 writes data into the volume of its own storage, and buffers the data until the writing of data into the volume of the secondary storage apparatus 1600 is complete. Buffer utilization is a value showing the usage level of the buffer. When the buffer continues to increase, or when the buffer exceeds a given value, it is possible to predict that some kind of failure will occur, and, therefore, it is important to monitor the buffer utilization.

FIG. 17 shows the configuration of an additional information table 17000 storing additional information of the copy group. The difference between the additional information table 17000 and the additional information table 6000 is in that the primary/secondary differential time field 17200 and the buffer utilization field 17300 are provided in substitute for the concordance rate field 6200 as additional information.

FIG. 18 shows the configuration of a copy group summary table 18000 storing summary information of the copy group. The difference between the copy group summary table 18000 and the copy group summary table 10000 shown in FIG. 10 is in that a primary/secondary differential time field 18400 and a buffer utilization field 18500 are provided in substitute for the concordance rate field 10400. According to the copy group summary table 18000, it is evident that the copy group 18100 named CG.01 is Pair status, the primary/secondary differential time is 2 seconds, and the buffer utilization is 15%.

FIG. 19 shows a display example of the summary GUI 19000 displayed on the display device 1450 of the management computer 1400. The difference between the summary GUI 19000 and the summary GUI 13000, a primary/secondary differential time field 19300 and a buffer utilization field 19400 are provided in substitute for the concordance rate field 13300.

The difference between the processing method of the second embodiment and the processing method of the first embodiment is as follows. The processing sequence in the second embodiment regarding the update processing 7000 of the management table 1522 created in the storage apparatus 1500 is the same as the first embodiment. Nevertheless, although the concordance rate field 6200 of the additional information table 6000 was rewritten in the first embodiment during the additional information table update processing at step 7600, the primary/secondary differential time field 17200 and the buffer utilization field 17300 of the additional information table 17000 are rewritten in the second embodiment.

The processing sequence in the second embodiment in the copy group status acquisition processing 12000 executed by the management program 1412 of the management computer 1400 is the same as the first embodiment, and the concordance rate field 10400 of the copy group summary table 10000 was rewritten with the contents of the received additional information table 6000 in the first embodiment during the additional information rewrite processing at step 12600.

Meanwhile, in the second embodiment, the primary/secondary differential time field 18400 and the buffer utilization field 18500 of the copy group summary table 18000 are rewritten with the contents of the received additional information table 17000. Other than the foregoing points, the second embodiment performs the same processing as the first embodiment.

In the second embodiment, with respect to the primary volume and the secondary volume of a plurality of copy pairs configuring a single copy group, the primary volume is stored in one storage apparatus 1500 and the secondary volume is stored in one storage apparatus 1600. Nevertheless, the primary volume and the secondary volume of a plurality of copy pairs configuring a single copy group may also be respectively stored in a plurality of storage apparatuses.

In addition, although the second embodiment explains a case of connecting one storage apparatus 1500 to one host computer 1300, it may also be connected to a plurality of host computers.

When a single copy group is configured across a plurality of storage apparatuses 1500, 1600 as described above, the present invention can be implemented by defining one storage apparatus as a representative storage apparatus, and collecting the status of all copy pairs configuring the copy group in the storage of the representative storage apparatus.

The second embodiment is explained on the premise that a copy group configured from a plurality of copy pairs has been preliminarily defined in the management table 1522 of the storage apparatus 1500, and the pair status table 4000 in the storage apparatus 1500 is created based on such defined information.

Nevertheless, even if the copy group information is not defined in advance, the present invention can be implemented by defining which copy pairs are configuring the copy group midway during the operation. An example of the implementing the present invention by defining the copy group information midway during the operation is explained below.

FIG. 20 shows the configuration of a copy group definition command table 20000 to be issued from the management program 1412 of the management computer 1400 to the storage microprogram 1530 of the storage apparatus 1500. The copy group definition command table 20000 is configured from a copy group name field 20100, a copy pair name field 20200, a primary volume name field 20400, and a secondary volume name field 20500.

The copy group name field 20100 displays the name of the copy group. The copy pair name field 20200 stores the name of the copy pair. Although a copy pair is uniquely identified based on the primary volume name and the secondary volume name, since this alone will make management of a copy pair difficult, a copy pair is usually managed with a logical name as the copy pair name described above. The primary volume name field 20400 stores the volume name of the primary volume of the copy pair. The secondary volume name field 20500 stores the volume name of the secondary volume of the copy pair.

According to the pair status table 2000 of this embodiment, the copy group CG.01 is configured from three copy pairs; namely, a copy pair 20600 named P1, a copy pair 20700 named P2, and a copy pair 20800 named P3.

The processing flow is explained below. The management program 1412 of the management computer 1400 issues a copy group definition command to the storage apparatus 1500. This command includes the copy group definition command table 20000.

When the storage microprogram 1530 of the storage apparatus 1500 receives a copy group definition command, it creates a pair status table 4000 in the management table stored in the memory 1521, and rewrites the copy group name field 4100, the copy pair name field 4200, the primary volume name field 4400, and the secondary volume name field 4500 with the contents of the copy group definition command table 20000. The pair status field 4300 remains a blank column.

As a result of taking the foregoing step, the present invention can be implemented by performing the same processing as the processing described above after the foregoing processing. Although the copy group definition command was issued from the management program 1412 in the management computer 1400 in the foregoing example, this command may also be issued from the application 1312 in the host computer 1300.

Third Embodiment

The third embodiment is configured such that an agent computer 21100 as an auxiliary management computer is disposed between the storage apparatus 1500 and the management computer 1400, the agent computer 21100 and the storage apparatus 1500 are connected via a collection network 21200, the agent computer [21100] and the management computer 1400 are connected via a management network 1200, and the management computer 1400 sends and receives data to and from the storage microprogram 1530 in the storage apparatus 1500 via the agent computer 21100, and the remaining configuration is the same as the first embodiment. The difference with the first embodiment is explained below.

Figure 21:
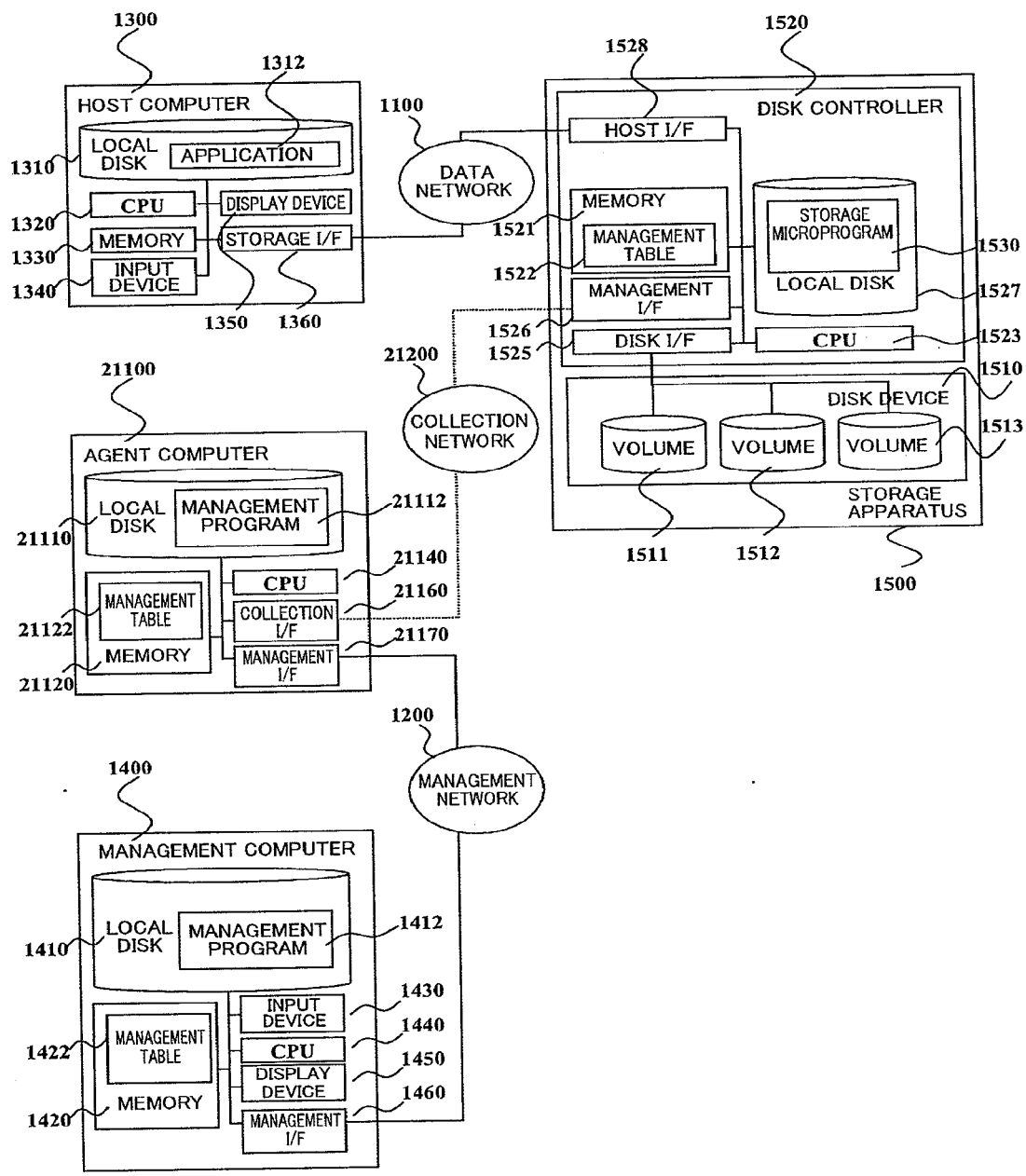
FIG. 21 is a system configuration diagram showing a third embodiment of a storage system according to the present invention.

FIG. 21 shows the configuration of a storage system when the type of replication is a local copy. The present invention can also be implemented in a case where the type of replication is a remote copy. The configuration of the third embodiment is now explained below while focusing on the difference with the first embodiment.

The storage apparatus 1500 and the agent computer 21100 are connected via a data collection network 21200. Although this embodiment explains a case where the data collection network 21200 is a storage area network, it may also be an IP network or another data communication network.

The agent computer 21100 and the management computer 1400 are connected via a management network 1200. Although this embodiment explains a case where the management network 1200 is an IP network, it may also be a storage area network or another data communication network. In addition, the data network 1100 and the collection network 21200 may be the same network, and the agent computer 21100 and the host computer 1300 may be the same computer.

For the sake of explanation, although the third embodiment explains a case where there is one storage apparatus 1500, one host computer 1300, one management computer 1400, and one agent computer, the present invention is not limited to the foregoing configuration.

The agent computer 21100 is configured from a CPU 21140, a memory 21120, a local disk 21110, a data collection I/F 21160 for sending and receiving data and control commands to and from the storage apparatus 1500 for data collection, and a management I/F 21170 for sending and receiving data and control commands to and from the management computer 1400 for system management.

The local disk 21110 is a disk device such as a hard disk connected to the agent computer 21100, and stores the management program 21112. The management program 21112 is loaded in the memory 21120 of the agent computer 21100, and executed by the CPU 21140. The operation of the management program 21112 and the configuration of the management table 21122 will be described later.

The data collection I/F 21160 is an interface with the data collection network 212200, and sends and receives data and control commands to and from the storage 1500. The management table 21122 in the memory 21120 is configured from a pair status table 4000, a summary table 5000, and an additional information table 6000. The configuration of the respective tables is the same as the first embodiment.

In the first embodiment, the copy group status determination table 3000 and the transfer table determination table 8000 were retained in the storage microprogram 1530 of the storage apparatus 1500. In this embodiment, however, let it be assumed that these tables are retained in the management program 21112 of the agent computer 21100. The present invention can also be implemented even when these tables are stored separately from the management program 21112; for instance, stored in the local disk 21110 of the agent computer 21100.

In the first embodiment, the management table 1522 created in the memory 1521 of the storage apparatus 1500 was configured from a pair status table 4000, a summary table 5000, and an additional information table 6000. In this embodiment, however, the management table 1522 created in the memory 1521 of the storage apparatus 1500 is configured only from the pair status table 4000.

In this embodiment, the copy groups are defined via the agent computer 21100. In other words, when a copy group is defined, the storage microprogram 1530 of the storage apparatus 1500 creates a pair status table 4000 in the management table 1522 of the memory 1521 in the storage apparatus 1500, and the management program 21112 of the agent [computer] 21100 creates a pair status table 4000 in the management table 21122 of the memory 21120 in the agent computer 21100.

Here, the storage microprogram 1530 of the storage apparatus 1500 rewrites the copy group name field 4100, the copy pair name field 4200, the primary volume name field 4400, and the secondary volume name field 4500 shown in FIG. 4 based on the information defined upon creating the pair status table 4000. Here, the pair status field 4300 is a blank column.

Figure 22:
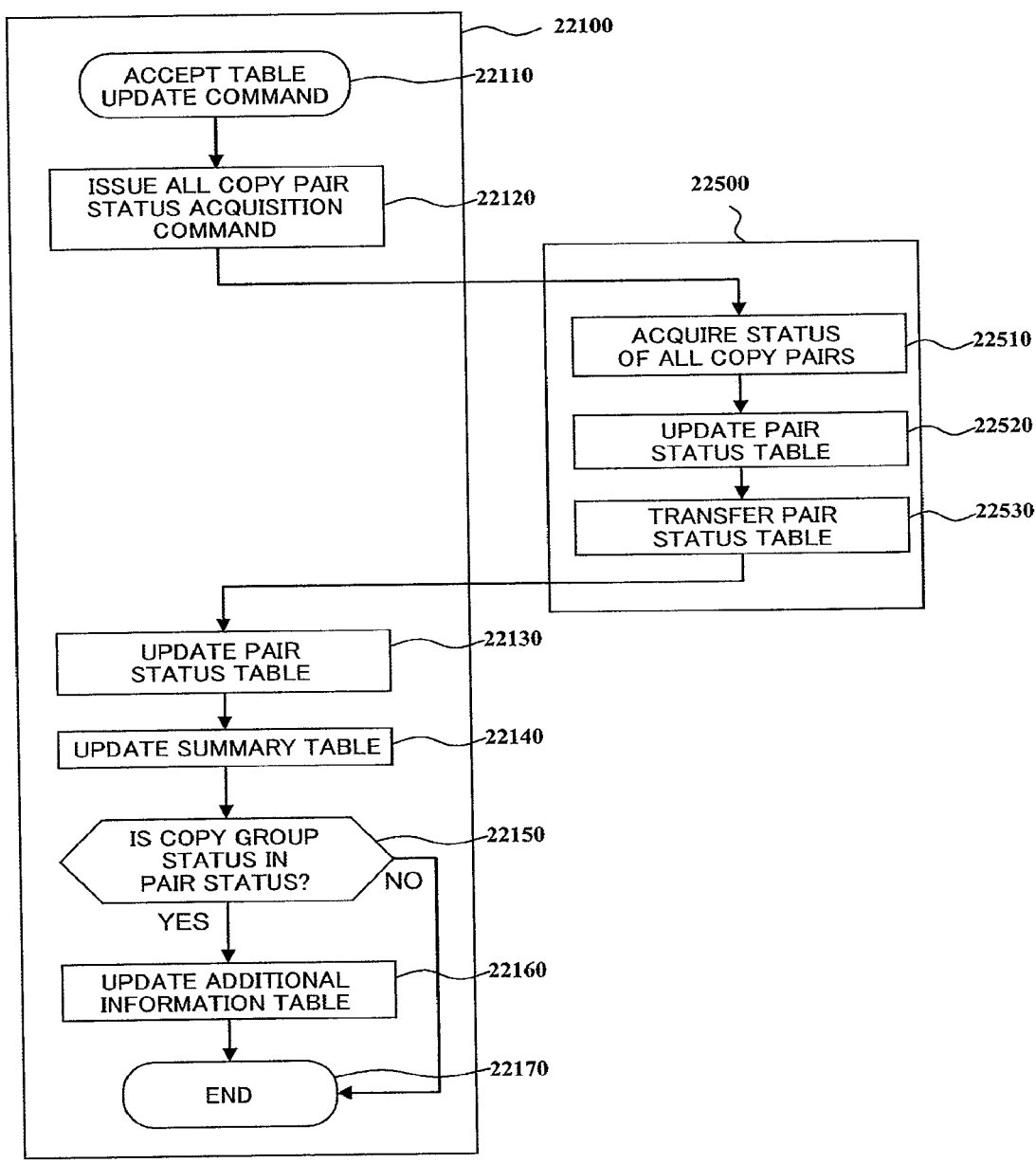
FIG. 22 is a flowchart showing the processing operation of a management program and a storage microprogram to perform update processing of a management table in the third embodiment.

The operation upon receiving the copy pair status transfer command to be executed by the management program 21112 in the agent computer 21100 and the microprogram 1530 in the storage apparatus 1500 is now explained with reference to the flowchart of FIG. 22. Although the copy pair status transfer command is issued from the management computer 1400 to the storage apparatus 1500 in the first embodiment, in this embodiment, it is issued from the management computer 1400 to the agent computer 21100.

The processing of this embodiment is configured from the processing 22100 to be executed by the management program 21112 in the agent computer 21100 and the processing 22500 to be executed by the microprogram 1530 in the storage apparatus 1500.

When the management program 21112 in the agent computer 21100 initially receives a copy pair status transfer command from the management computer 1400 (step 22110), the management program 21112 in the agent computer 21100 issues a command for acquiring the status of all copy pairs to the microprogram 1530 in the storage apparatus 1500 (step 22120).

When the microprogram 1530 in the storage apparatus 1500 receives the command for acquiring the status of all copy pairs from the management program 21112 in the agent computer 21100, it acquires the status of all copy pairs (step 22510), and rewrites the pair status field 4300 of the pair status table 4000 in the memory 1521 according to the acquired status of all copy pairs (step 22510).

When the rewriting is complete, the microprogram 1530 in the storage apparatus 1500 transfers the updated pair status table 4000 to the agent computer 21100 (step 22530).

When the management program 21112 in the agent computer 21100 receives the pair status table 4000 from the microprogram 1530 in the storage apparatus 1500, it rewrites the [pair] status table 4000 in the memory of the agent computer 21100 according to the received information (step 22130).

Subsequently, the management program 21112 in the agent computer 21100 updates the copy group status field 5200 and the flag field 5300 of the summary table 5000 based on the determination table 3000 (step 22130), refers to the copy group status field 5200 of the updated summary table 5000, and checks whether the copy group status is Pair or another status (step 22150).

If the copy group status is Pair at step 22150, the management program 21112 in the agent computer 21100 acquires the concordance rate of the copy group, stores the acquired concordance rate of the copy group in the concordance rate field 6200 of the additional information table 6000 (step 22160), and then ends the processing (step 22170).

If the copy group status is not Pair at step 22150, the management program 21112 in the agent computer 21100 directly ends the processing (step 22170).

Pursuant to the enlargement of replication, needs for collectively managing a plurality of storage apparatuses 1500 installed at a location that is geographically distant with a single management computer 1400 are increasing. This embodiment meets such needs.

In other words, when there are a plurality of storage apparatuses 1500, an agent computer 21100 is installed for each storage apparatus 1500, for each storage apparatus 1500 existing in a geographically similar location.

According to this embodiment, since the agent computer 21100 is disposed between the storage apparatus 1500 and the management computer 1400, and the management computer 1400 sends and receives data to and from the storage microprogram 1530 in the storage apparatus 1500 via the agent computer 21100, it is possible to reduce the load of communication between the agent computer 21100 and the management computer 1400, and it is also possible to reduce the load of communication for collecting information from a plurality of storage apparatuses 1500 installed at a geographically distant location.

Further, according to this embodiment, since a significant portion of the processing that was performed by the microprogram 1530 in the storage apparatus 1500 in the first embodiment is performed by the agent computer 21100, it is possible to reduce the management load of the storage apparatus 1500.

What is claimed is:

1. A storage system comprising:

a host computer;

a storage apparatus connected to said host computer and for storing information accessed by said host computer; and a management computer for managing said storage apparatus, the management computer including a display;

wherein said storage apparatus includes:

a primary storage unit for storing write data from said host computer as a primary volume;

a secondary storage unit for storing copied data of write data stored in said primary storage unit, as a secondary volume; and a status management unit for collecting and managing status information of a plurality of copy pairs from said primary storage unit and said secondary storage unit, with each copy pair of the plurality of copy pairs, including a copy source primary volume and a copy destination secondary volume, and with the status information including both copy group summary status information providing a status of a group of the plurality of copy pairs, and detailed status information detailing a status of a copy pair included in the group; and wherein said status management unit monitors the status information of said plurality of copy pairs, wherein the management computer acquires, from the storage apparatus, the copy group summary status information as summary information for a group of the plurality of copy pairs having a failure status for the group, and displays said summary information on said display, if the summary information indicates a normal status, the management computer displays the summary information only and does not display detailed status information of copy pairs belonging to the group; and if the summary information indicates a failure status, the management computer displays, upon receiving selection of said summary information, detailed status information of a copy pair that belongs to the group such that said detailed status information of the copy pair that belongs to the group is only displayed if the summary information indicates a failure status.

2. The storage system according to claim 1, wherein the management computer acquires the copy group summary status information and the detailed status information simultaneously.

3. The storage system according to claim 1, wherein the management computer acquires, upon receiving selection of the summary information, the detailed status information from the storage apparatus.

4. The storage system according to claim 3, wherein the selection of the summary information is effected by a user clicking on the summary information displayed on the display of the management computer.

* * * * *